(No Model.)
P. HELMON.
BICYCLE BRAKE.
No. 583,371. Patented May 25, 1897.
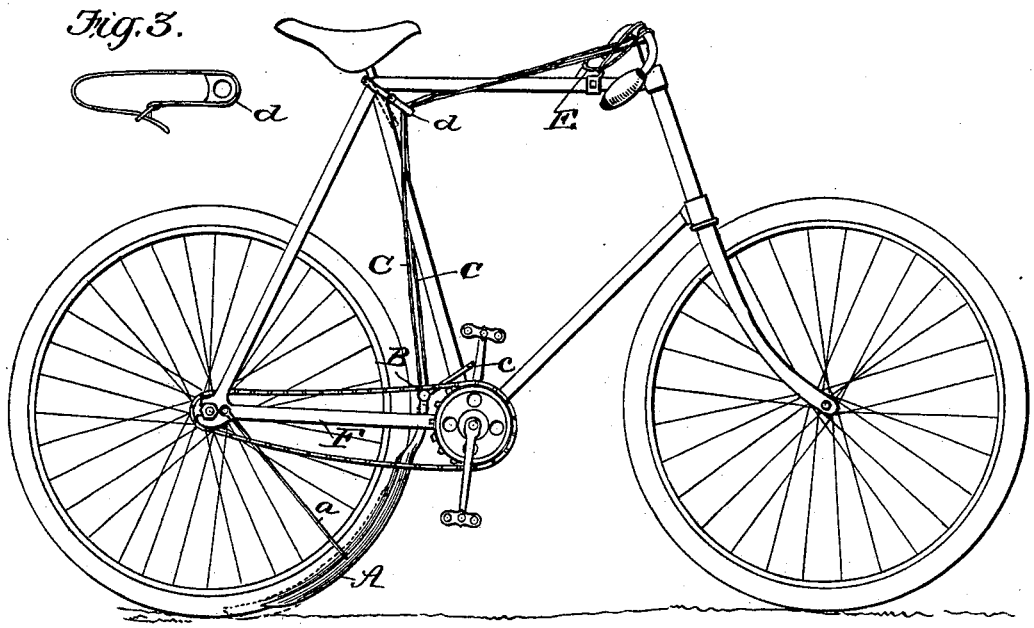
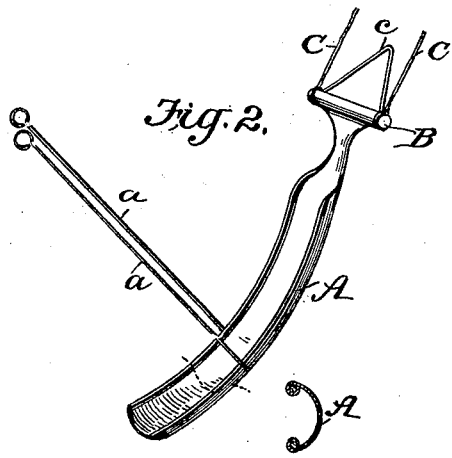
WITNESSES:
Jos. A. Ryan
Edw. W. Byrn.
INVENTOR
Preston Helmon
BY Munn & Co.
ATTORNEYS.

UNITED STATES PATENT OFFICE.

PRESTON HELMON, OF CHARLESTON, SOUTH CAROLINA.

BICYCLE-BRAKE.

SPECIFICATION forming part of Letters Patent No. 583,371, dated May 25, 1897.

Application filed January 18, 1897. Serial No. 619,643. (No model.)

*To all whom it may concern:*

Be it known that I, PRESTON HELMON, of Charleston, in the county of Charleston and State of South Carolina, have invented a new and useful Improvement in Bicycle-Brakes, of which the following is a specification.

The object of my invention is to provide a quickly-acting brake for a bicycle which will permit a very short stop to be made, the same being designed more especially for the use of the soldier, the police, or the racer, but being generally useful for going downhill or avoiding collisions.

It consists in the special construction and arrangement of a friction runner-brake applied to the front part of the rear wheel and arranged to be lifted to a position out of contact with the wheel and the ground or to be let down so that it rubs with a sliding friction on the ground while the wheel bears against it in the rear, as hereinafter more fully described with reference to the drawings, in which—

Figure 1 is a side elevation of a bicycle with my brake attached to it and showing it in elevated position or out of use in full lines and showing in dotted lines the brake down and in action. Fig. 2 is a detail perspective of the brake detached, and Fig. 3 is a detail of the guide-loop for the operating-cords.

In the drawings, A represents the brake, which consists of a light strip of sheet metal, leather, rawhide, or other tough, light, and durable material which is bent to correspond with the curve of the rear wheel and extends about one-fourth the way around its circumference. The brake is curved in cross-section to form a trough-like concavity on its rear side to receive and fit the tire of the rear wheel, and the parallel longitudinal edges of said brake are rolled or curled and provided with a central stiffening wire or rod contained within said curled edge. At the top of the brake there is firmly attached a short metal cross-bar B of about a half-inch thickness, to whose opposite ends are attached suitable cords C C, by which the brake is manipulated. The lower part of the brake is rigidly attached to two light rods $a\ a$, which pass from the brake on opposite sides of the wheel to a pivot on or near the axle and upon which they are hung so as to swing radially.

The brake A lies between the two branches of the horizontal fork F, and the cross-bar B at the top of the brake extends laterally far enough to rest upon the fork F when the brake is applied or in its lowest position, which fork, through said cross-bar, holds the brake against its dragging action on the ground and prevents it from descending any lower. A metal guide $c$ is attached to the upper end of the brake and encircles and slides up and down on the seat-post.

The cords C C by which the brake is lifted extend from the opposite ends of the cross-bar B to two small loops $d$, which are made of leather, with a rigid eye (or pulley) over which the cords pass. These loops are buckled beneath the saddle and the cords pass thence to the front around the handle-bars and then pass back to and are caught over the hook E, provided for that purpose. For a woman's bicycle the brake will be arranged in the same manner, but the cords will need to be extended to the handles in another direction in order to accommodate the skirts of the lady rider.

In making use of this brake all that is necessary to make a sudden stop is to release the cord and allow the brake to drop to the ground of its own weight. When it reaches this point, the wheel runs upon and bears against it with a powerful frictional contact, and as the brake cannot pass under the wheel on account of the ends of the cross-bar B shouldering or finding a bearing upon the top of the fork F the brake acts as a friction-runner upon the ground also and the bicycle is brought to a sudden stop. The suddenness of the stop, however, may be regulated and the bicycle be brought to a gradual stop by simply holding the brake by the cords and letting it down gradually.

I am aware that a sliding runner-brake has heretofore been used on wagon-wheels, and I therefore only claim the novel construction and arrangement of devices in connection with a bicycle.

Having thus described my invention, what I claim as new, and desire to secure by Letters Patent, is—

1. The combination with the rear wheel of a bicycle, of a curved runner-brake arranged in front of said rear wheel, arms for supporting the same hung upon an axis at their rear ends, a cross-bar or laterally-projecting bearing at the top of the brake arranged to extend across and find a support upon the two branches of the horizontal fork when the brake is down and means for raising and lowering the brake substantially as and for the purpose described.

2. The combination with the rear wheel of a bicycle, of a curved runner-brake arranged in front of said rear wheel, arms for supporting the same hung upon an axis at their rear ends, a cross-bar or laterally-projecting bearing at the top of the brake arranged to extend across and find a support upon the two branches of the horizontal fork when the brake is down, cords connecting with the ends of said cross-bar, guides sustaining the cords beneath the saddle, and means for securing the cords at or near the handle-bar substantially as and for the purpose described.

PRESTON HELMON.

Witnesses:
R. C. GILCHRIST,
JNO. B. DUFFIE.